(12) United States Patent
Nicula et al.

(10) Patent No.: US 11,554,617 B2
(45) Date of Patent: Jan. 17, 2023

(54) PNEUMATIC TIRE

(71) Applicant: The Goodyear Tire & Rubber Company, Akron, OH (US)

(72) Inventors: Adrian Florin Nicula, Luxembourg (LU); Julien Alexandre Vaissaud, Arlon (BE); Peter Johann Cornelius Maus, Büllingen (BE); Baudouin Duchene, Bastogne (BE); Pierre Joseph Christian Bastin, Bigonville (LU); Paul Leclerc, Colmar-Berg (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 181 days.

(21) Appl. No.: 17/112,092

(22) Filed: Dec. 4, 2020

(65) Prior Publication Data
US 2021/0170810 A1    Jun. 10, 2021

Related U.S. Application Data

(60) Provisional application No. 62/943,413, filed on Dec. 4, 2019.

(51) Int. Cl.
*B60C 19/00* (2006.01)

(52) U.S. Cl.
CPC .................. *B60C 19/002* (2013.01)

(58) Field of Classification Search
CPC .............................. B60C 19/002; B60C 19/00
See application file for complete search history.

(56) References Cited

U.S. PATENT DOCUMENTS

| 8,888,939 | B2 | 11/2014 | Bormann | |
| 2010/0012243 | A1* | 1/2010 | Tanno | B60C 19/002 |
| | | | | 152/155 |
| 2010/0276049 | A1* | 11/2010 | Yukawa | B60C 19/002 |
| | | | | 152/450 |

(Continued)

FOREIGN PATENT DOCUMENTS

| DE | 102017210931 A1 * | 1/2019 | ............. B60C 19/00 |
| EP | 1795378 A2 | 6/2007 | |

(Continued)

OTHER PUBLICATIONS

JP 58185305 Machine Translation; Fujiwara, Kenichi (Year: 1983).*

(Continued)

*Primary Examiner* — Robert C Dye
*Assistant Examiner* — Nicholas J Weiler
(74) *Attorney, Agent, or Firm* — Alvin T. Rockhill (57) ABSTRACT

In a first aspect of the invention, the invention is directed to a pneumatic tire comprising two spaced apart bead portions, a tread portion, a pair of sidewalls extending radially inward from axially outer edges of the tread portion to join the respective bead portions, the axially outer edges of the tread portion defining a tread width, a carcass, an innerliner covering the carcass and defining a tire cavity, and multiple layers of foam strip material attached on top of each other to the innerliner within the tire cavity in an area radially below the tread portion, wherein at least two of the layers are interlocked to each other along their length so as to hold the layers together in a radial direction.

14 Claims, 4 Drawing Sheets

(56) References Cited

U.S. PATENT DOCUMENTS

| | | |
|---|---|---|
| 2011/0030865 A1 | 2/2011 | Folk et al. |
| 2011/0061781 A1* | 3/2011 | Tanno .................. B60C 19/002 |
| | | 181/290 |
| 2011/0308706 A1 | 12/2011 | Sandstrom et al. |
| 2012/0125507 A1 | 5/2012 | Bormann et al. |
| 2020/0114702 A1* | 4/2020 | Sakakibara ........... B60C 19/002 |
| 2020/0164702 A1* | 5/2020 | Shibata ................ B60C 23/064 |

FOREIGN PATENT DOCUMENTS

| | | |
|---|---|---|
| EP | 2397347 B1 | 12/2011 |
| EP | 2433786 A3 | 3/2012 |
| EP | 2457720 B1 | 5/2012 |
| EP | 2457749 B1 | 5/2012 |
| EP | 2554617 B1 | 2/2013 |
| EP | 2660037 A1 | 11/2013 |
| EP | 3431309 A1 | 1/2019 |
| JP | 58185305 * 10/1983 | ............. B60C 17/04 |

OTHER PUBLICATIONS

DE 102017210931 Machine Translation; Zebian, Makram (Year: 2019).*

European Search Report dated Mar. 31, 2021 for European Patent Application No. 20210944.3 which is the European counterpart to the subject patent application.

* cited by examiner

PNEUMATIC TIRE

This application claims benefit of U.S. Provisional Patent Application Ser. No. 62/943,413, filed on Dec. 4, 2019. The teachings of U.S. Provisional Patent Application Ser. No. 62/943,413 are incorporated herein by reference in their entirety.

FIELD OF THE INVENTION

The present invention is directed to a pneumatic tire comprising noise dampening foam strip material.

BACKGROUND

Tires generate noise when driving. It is known in the art that at least a part of that noise may be dampened by including foam material within the tire cavity for dampening tire cavity noise. An example of such a noise dampening material is given in United States Patent Publication No. 20120125507 A1 in which a single layer of rubber foam is applied to the innerliner of a tire. However, relatively thick layers result in internal strains in the foam material due to flexing and bending, thereby resulting in limited durability as fatigue cracks may occur. In other examples, such as in United States Patent Publication No. 20110030865 A1 tires are almost completely filled with foam. Filling essentially the whole tire cavity with foam is expensive and may also negatively affect cooling properties as well as driving performance of the tire. Noise dampening has recently become of even more importance in view of the growing number of electric vehicles which generate very little engine noise and accordingly which do not appreciably mask tire noise. Since tire noise is more noticeable in the operation of electric vehicles, they should optimally be equipped with tires that generate very little noise so that tire noise is not as evident. In the world today there continues to be a long felt need for tires that generate lower levels of noise during operation and there the demand for advanced noise cancellation technologies for pneumatic tires is higher than ever. However, significant room for improvement in this field of tire technology remains.

SUMMARY OF THE INVENTION

A first object of the invention may be to provide an advanced noise dampened pneumatic tire.

Another object of the invention may be to provide an advanced noise dampened pneumatic tire which is relatively easy to produce at a commercially viable cost.

Another object of the invention may be to provide an advanced noise dampened tire having a flexible noise dampening system adaptable to different tires, in particular different tire sizes and/or cavity volumes.

Another object of the invention may be to provide a pneumatic tire with a foam noise dampener that allows a more homogeneous weight distribution and/or has less tensions within the dampening material.

Another object of the invention may be to provide a pneumatic tire having a plurality of foam strips connected easily and reliable together.

The scope of the present invention is defined by the independent claims. Preferred embodiments are listed in the dependent claims as well as in the following description.

Thus, in a first aspect of the invention, the invention is directed to a pneumatic tire comprising two spaced apart bead portions, a tread portion, a pair of sidewalls extending radially inward from axially outer edges of the tread portion to join the respective bead portion(s), the axially outer edges of the tread portion defining a tread width, a carcass, an innerliner covering the carcass and defining a tire cavity. Multiple layers of foam strip material are attached on top of each other to the innerliner within the tire cavity in an area radially below the tread portion, wherein at least one layer consists of noise damping foam strip material and wherein at least two of the layers are (mechanically) interlocked to each other along their length so as to hold the layers together in a radial direction.

It has been found by the inventors that a mechanical interlocking along the strip length can be a reliable and relatively cost-effective means to provide and ensure a safe connection between two adjacent layers of foam strip material. Moreover, this allows avoidance of glues, thereby reducing the ecological footprint. Another advantage of the present invention consists in the possibility to have multiple relatively thin layers arranged on top of each other instead of one thick layer. This helps to fix one or more ends of the layers in an easier manner as strain and/or bending forces are limited due to flexibility in each layer. The curvature of the tire is followed more easily by the plurality of the layers, wherein each of the layers have a different length (depending on the surface it is attached to). This results also in an easier installation procedure and reduces the risk that foam strips loosen from the innerliner. The risk of rupture of the strip material due to forces during mounting and/or use during tire life is reduced. In addition, the interlocked connection is also more strain and/or rupture resistant than a connection via adhesives.

In an embodiment, the noise damping foam strip material is an open cell foam strip material. Open cell dampening material is much more suitable for dampening noise and/or vibration than closed cell foam material. In particular, an acoustic attenuation of tire cavity resonance is supported by the noise damping features of the present invention. Open cell noise damping foam material shall however not be understood herein as covering fully reticulated foam which constitutes a three-dimensional net, substantially free of cells or cell walls. While such material may have relatively good ventilation properties it is not deemed to be best suitable for dampening noise. Moreover, the latter material is relatively expensive.

In another embodiment, the open cell noise damping material has a density ranging from 0.01 g/cm$^3$ to 1 g/cm$^3$, optionally from 0.02 g/cm$^3$ to 0.5 g/cm$^3$. Such material has turned out to be of particular interest.

In another embodiment, the open cell foam strip material comprises from 55% to 95% (or preferably from 60% to 90%) open cells (of all cells) in the material. An open cell can be understood as a cell having at least one aperture. In other words, open cells are not fully closed or not fully enclosed by a cell wall. Closed cell foam does not fall into the above range as most cells of this foam type are closed. Fully or almost fully reticulated foam does not fall under that range either as it has almost no walls and constitutes rather an open grid. Whether cells are open or not (i.e. closed) can for instance be determined by light microscopy, SEM or NMR. Cell sizes could typically range from 10 µm to 1 mm (maximum diameter).

In still another embodiment, a first layer attached to the inner liner is made of (e.g. fully) reticulated foam strip material and at least one further layer is interlocked to said first layer on a radially inner side of the first layer, wherein the further layer is made of a noise damping open cell foam strip material. The interlocking of such layers along their length may be of particular advantage as reticulated foam may be difficult to glue to other foams in view of its relatively small surface area. Although there may be some known methods to overcome that issue, they are relatively expensive.

In another embodiment, multiple or all layers may be made of noise damping open cell foam strip material.

In still another embodiment, each layer has an axial width ranging from 20% (preferably 30%) to 80% of the tread width and a radial thickness ranging from 5% to 20% of the tread width and said multiple layers fill together from 8% (preferably 15%) to 40% of the volume of the tire cavity. Providing a plurality of layers of foam strip material on top of one another or in other words in a stacked manner or arrangement, may allow on the one hand to use same or similar strip material depending on the desired level of noise dampening and on the other hand to use the same or similar material for different tire sizes. Moreover, the desired amount of foam material for the tire cavity has been found by the inventors to constitute a good compromise between material cost, covered space and/or dampening properties. The term tire cavity, as mentioned herein, shall be the volume enclosed by the innerliner of the tire (especially in an unmounted and uninflated state), and closed by an (imaginary) circumferential ring-shaped plane contacting the radially innermost edges of both bead portions.

In still another embodiment, said multiple layers are integrally formed and spirally wound on top of one another in the tire cavity. Such an embodiment may allow an easy mounting of the foam strip layers, in particular in connection with the interlocking features of the present invention.

In still another embodiment, a first layer of said multiple layers has a first butt splice arranged at a first circumferential position of the tire cavity, and a second layer of said multiple layers has a second butt splice arranged at a second circumferential position of the tire cavity which is different from the first circumferential position. In other words, each layer may be made of a single piece of foam strip material provided in a circumferential direction within the tire cavity and closed at its two ends with a butt splice. In case of having just one butt splice in a tire having just a single layer of foam strip material (not in accordance with the present invention), the position of the splice may result in unbalances. Having multiple layers on top of each other with splices at different circumferential (or angular) position helps to reduce such unbalances.

In another embodiment, the position of the second butt splice of the second layer is arranged at an angular position which is between 100° and 260°, optionally between 130° and 230°, circumferentially shifted (or rotated) from an angular position of the first butt splice of the first layer. This makes clear that an essentially opposite arrangement may be of particular interest, e.g. to avoid unbalances. Moreover, splices positioned at the bottom of a stack of layers are protected by the layers above as the splices are not provided at the same angular position. The probability of loosening of a whole foam strip is thereby further reduced compared to the provision of one relatively thick strip.

In yet another embodiment, the layers have one or more of: an axial width from 50% to 70% of the tread width and a radial thickness from 5% to 15% of the tread width and, optionally, fill together from 20% to 40% of the volume of the tire cavity. This combination of parameters has been found by the inventors as even more desirable. This does not necessarily mean (as for the broader ranges) that all layers have the same width and/or thickness. References to thickness of the layer shall, unless indicated otherwise herein, not be understood to include the thickness of male connecting/mating members or elements.

In another embodiment, the layers are arranged essentially in parallel to the equatorial plane of the tire and have each a length covering at least 80% of the inner circumference of the tire, preferably at least 90% or at least 99%. In particular, the layers may be continuously arranged—either on top of each other or spirally wound.

In yet another embodiment, the number of layers is from 2 to 4 layers, preferably 2 or 3 layers. This number may provide a good compromise between flexibility and work amount needed to install the layers.

In yet another embodiment, a first layer attached to the innerliner is longer than a second layer attached onto the first layer. In particular, the length of the radially innermost circumferential surface of the second layer is smaller than the length of the radially innermost circumferential surface of the first layer. As both layers have different lengths, stresses onto the strip material are smaller in the case of having a single relatively, radially thick layer.

In still another embodiment, said interlocking is essentially continuous over the length of the foam strip material between two layers attached on top of each other. In other words, the cross-sectional shape of the foam strip material may be essentially the same along the length of the strip.

In still another embodiment, said layers are attached to each other by a mating connection, wherein a male connecting member or element of a first layer is connected to a female connecting member or element of a second layer.

In still another embodiment, a first layer has on one of a radial inner side and a radial outer side a female connecting member and on a radially opposite side a male connecting member for connecting to a respective female connecting member of a second layer. In other words, each layer of a plurality of layers has a male and a female connecting member for connection to a further layer.

In yet another embodiment, said male connecting member and female connecting member are integrally formed in the strip material. Preferably, a female connecting member may be considered as an aperture in the strip material which has a shape complementary to the shape of a male member.

In yet another embodiment, a first layer is attached to the innerliner of the tire by its male member via an adhesive. In other words, a radially outer surface of the male member is glued to the innerliner. The adhesive could also be sealant material.

In still another embodiment, the male member of the first layer extends over an axial width of 20% to 100% of the axial width of the first layer, and a radially outer surface of the male member of the first layer has a larger axial width than a radially inner portion of the male member of the first layer, wherein said larger axial width is at least 2 times larger than the axial width of the radially inner portion of the male member of the first layer.

In still another embodiment, said layers are interlocked by one or more of: one or more dove tail connections, jigsaw-puzzle connector-shaped connections, hook-and-loop connections such as Velcro connections, plastic rivets, plastic screws.

In yet another embodiment, a radially outermost foam strip material layer is attached to the innerliner by at least one of sealant material, adhesive and glue.

In still another embodiment, the foam material can be comprised of one or more of the following: polyurethane foam, polyethylene foam, foam rubber, and the like. Suitable polyurethane foams are typically made by the polymerization of a diisocyanate and a polyol in the presence of a suitable blowing agent. A wide variety of rubber foams can be utilized in the practice of this invention with natural rubber, synthetic polyisoprene rubber, polybutadiene rubber, nitrile rubber, and styrene-butadiene rubber foams being commonly used. Such foam rubbers are typically made by foaming a natural or synthetic rubber latex with a chemical foaming agent. The chemical foaming agent will typically be an azo compound, such as azodicarbonamide, a hydrazine compound, a carbazide, a tetrazole, a nitroso compound, and/or a carbonate, such as sodium bicarbonate.

In another embodiment, the open cell noise damping foam strip material is adapted and/or used for dampening tire cavity noise, in particular in the range from 100 Hz to 300 Hz or in the range from 100 Hz to 200 Hz or from 200 Hz to 300 Hz.

In another embodiment, the open cell noise damping foam strip material is (essentially) free of reticulated foam.

In another embodiment, the density of the open cell noise damping foam strip material in a first layer contacting the innerliner is lower than a density of a second layer of open cell noise damping foam strip material attached to the first layer. Higher density may improve acoustic damping but allows for smaller thermal conduction which may negatively impact durability of the foam and/or the tire. A lower density open cell noise damping foam strip material may improve thermal conduction but has more limited acoustic damping characteristics.

In still another embodiment, a first foam strip layer attached to the innerliner has a smaller axial width than a second layer arranged on top of (or in other words radially inside of) the foam strip layer attached to the innerliner. Such an embodiment may help to improve the cooling of the tread and/or crown area of the tire as less insulating material is directly attached to the innerliner. Preferably, the second layer has an at least 20% larger width than the first layer attached to the innerliner, and optionally an at most 50% larger width than the first layer. Such an arrangement would not be possible with non-customized foam strip material when using only a single layer.

In still another embodiment, at least one of the layers has a butt splice mechanically interlocked at its meeting face sides. This may also help to avoid gluing. For instance, the above mentioned means for interlocking could be used.

In still another embodiment, the tire is free of sealant material, in particular free of sealant material on the innerliner.

In yet another embodiment, at least one of the layers is coated with metal. A metal coating helps to guide heat away from hot spots. This may be of particular interest for the surfaces of the layer facing and/or attached to the innerliner of the tire. The metal coating can be done by various methods such as metallization, galvanic coating, sputtering, chemical vapor deposition, and the like.

In yet another embodiment, at least two layers have one or more of: the same radial thickness and the same radial width, wherein said multiple layers are optionally made of the same material. Such parameters may help to reduce costs and/or facilitate mounting.

In an embodiment, the tire is one of: a truck tire, a bus tire, a passenger car tire. In particular, vehicles having closed cabins may benefit from the invention as the noise level inside the passenger cabin can be reduced. For example, the tire is a bus tire for a rim size of 22.5 inch.

In another aspect of the invention, a pneumatic tire is provided, the tire comprising two spaced apart bead portions, a tread portion, a pair of sidewalls extending radially inward from axially outer edges of the tread portion to join the respective bead portion(s), the axially outer edges of the tread portion defining a tread width, a carcass, an innerliner covering the carcass and defining a tire cavity, and multiple layers of a foam strip material (or noise damping foam strip material) attached on top of each other to the innerliner within the tire cavity in an area radially below the tread portion, wherein at least two of the layers are interlocked to each other along their length so as to hold the layers together in a radial direction. The tire of this aspect may also be combined with the features of several embodiments mentioned herein in relation to other aspects.

In still another aspect of the invention, a method of manufacturing a foam dampened pneumatic tire is provided, the method comprising the steps of: providing a pneumatic tire having a tire cavity; attaching a first layer of open cell, noise damping foam strip material circumferentially to an innerliner of the tire; attaching a second layer of open cell noise damping foam strip material onto the first layer by interlocking the second layer to the first layer.

In an embodiment, the method further comprises the step of attaching a third layer onto the second layer.

In another embodiment, the method further comprises the step of providing a first strip of the open cell noise damping foam strip material and attaching the first strip circumferentially to the innerliner of the tire and optionally closing the first strip at its two ends by a butt splice.

In another embodiment, the method further comprises the step of providing a second strip of the open cell noise damping foam strip material and attaching the second strip circumferentially onto the first strip and optionally closing the second strip at its two ends by a butt splice, wherein, optionally, the second strip is shorter than the first strip.

In another embodiment, the butt splice of the second layer is arranged at an angular position which is between 100° and 260°, optionally between 130° and 230°, circumferentially shifted (or rotated) from an angular position of the first butt splice of the first layer.

In another embodiment, providing a strip of open cell noise damping foam strip material, which is longer than the inner circumference of the tire, and spirally applying the strip in parallel to the equatorial plane of the tire so as to form at least two (or at least three) layers of the open cell noise damping foam strip material radially on top of one another.

The words "damping" and "dampening" are used interchangeable for purposes of this document and can be used as replacements for each other.

It is emphasized that one or more aspects, embodiments, or features thereof, may be be combined with one another within the scope of the present invention.

BRIEF DESCRIPTION OF THE DRAWINGS

The structure, operation and advantages of the invention will become more apparent upon contemplation of the following description taken in conjunction with the accompanying drawings, wherein.

DETAILED DESCRIPTION OF THE EMBODIMENTS

Figure 1:
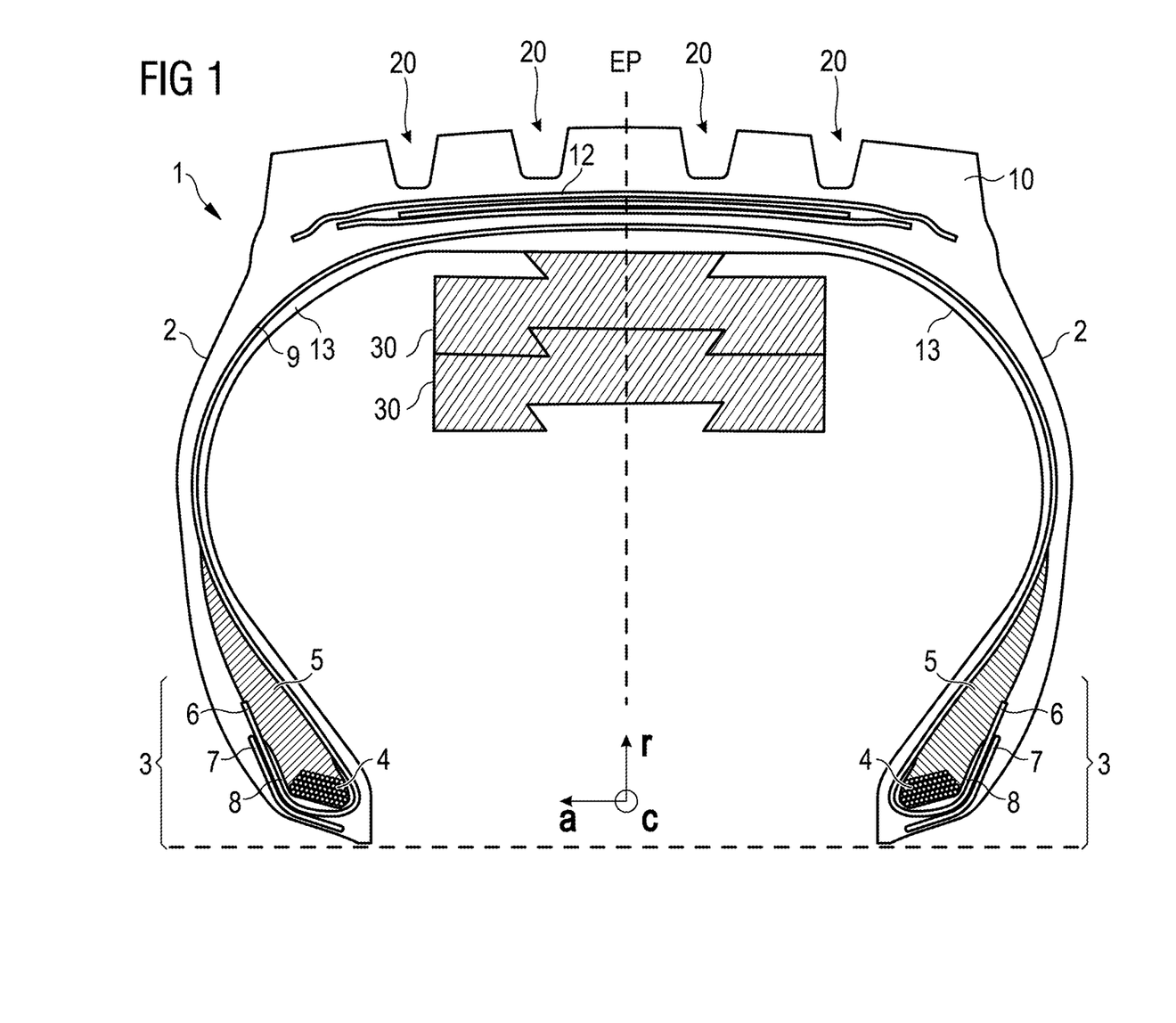
FIG. 1 shows a schematic cross-section of a truck or bus tire having two interlocked layers of foam material in accordance with an embodiment of the present invention.

FIG. 1 is a schematic cross-section of a bus or truck tire 1. The tire 1 has a tread 10, an innerliner 13, a belt structure comprising a plurality of belt plies 12, a carcass ply 9, two sidewalls 2, and two bead regions 3 comprising bead filler apexes 5 and beads 4. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves 20, each groove essentially defining a U-shaped opening in the tread 10. In accordance with a first embodiment of the invention the tire 1 comprises two (stacked) interconnected layers 30 of a noise damping foam strip material. They are attached to the radially inner side of the innerliner 13, preferably by means of a glue such as Loctite® glue from Henkel, for instance the Loctite® 5900 series including 5900, 5910 and 5970. Both layers 30 are essentially arranged in the circumferential direction in parallel to the equatorial plane EP of the tire 1. In the depicted embodiment, the first layer attached to the innerliner 30 is glued with a radially outermost surface of a male connecting element (in this example a dovetail-shaped connector) to the innerliner 30. On a radially inner side, the first strip or layer 30 has a female connecting element, i.e. an aperture having a shape complementary to a male element of the second layer 30 attached to the radially inner side of the first layer 30. In this manner, a stack of interconnected layers 30 can be built. Thereby a modular system is provided to easily adapt the total volume of foam in dependence of the tire cavity size of a given tire. Moreover, the depicted configuration has the advantage that the male dove tail element connecting the first layer 30 to the innerliner has a smaller axial width than the whole axial width of the first layer 30 and creates a gap between the majority of the surface of the first layer 30 facing the innerliner 13 below the tread. The slot between the first layer 30 and the innerliner 13 improves the cooling properties in comparison with tires in which a layer is attached to the innerliner with its full radially outer surface.

In a preferred example, the volume covered by the two layers 30 may be at least 8% of the tire cavity volume but less than 40% of the latter. The volume of the tire cavity shall be understood as the volume enclosed by the innerliner of the tire (especially in an unmounted and uninflated state) and closed by an (imaginary) circumferential ring-shaped plane contacting the radially innermost edges of both bead portions 3. That plane is schematically shown in FIG. 1 by a dashed line connecting the radially innermost edges of the tire 1.

Figure 4:
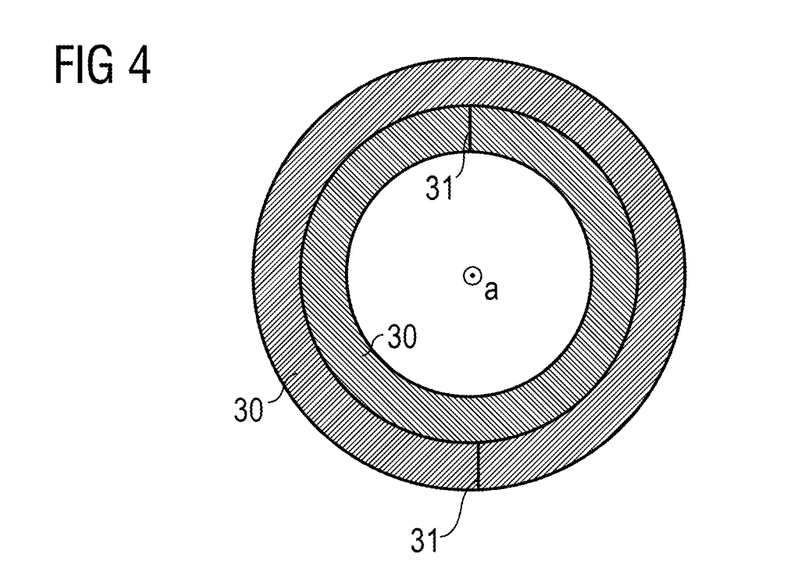
FIG. 4 shows a schematic cross-section in parallel to the equatorial plane of the tire showing two layers of foam strip material (as e.g. already shown in FIG. 1), wherein each layer has a butt splice (the tire as such is not shown).
Figure 5:
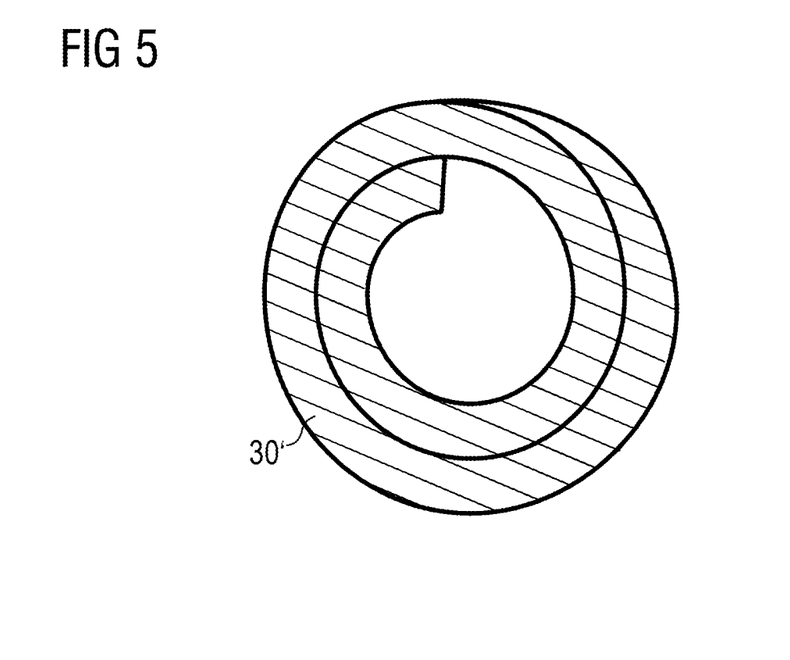
FIG. 5 shows a schematic cross-section in parallel to the equatorial plane of the tire showing a spirally arranged foam strip forming two layers (the tire as such is not shown).

The radial direction r, the circumferential direction c and the axial direction a have been indicated for the sake for easier reference. It is noted however, that the depicted orientations of the axial direction a and the circumferential direction c shall not be limiting the invention. As shown in FIG. 4, each layer of multiple layers may be wound in the circumferential direction, wherein each layer 30 may have a butt splice 31. Preferably, butt splices of different layers 30 are not provided at same angular positions but are for instance mounted opposite to each other as shown in FIG. 5 (shifted by 180° with respect to the circumferential direction). For the sake of clarity, the tire 1 as such is not shown in FIG. 4. The axial direction a is indicated in the center of the circumferentially arranged layers 30. Alternatively, and as schematically shown in FIG. 5, multiple layers could be spirally wound on top of each other by the same strip. Such an arrangement limits the number of splices and simplifies mounting. Although not explicitly shown in FIGS. 4 and 5, radially adjacent layers shall be considered as connected via (mechanical) interlocking.

While the embodiment of FIG. 1 suggests a plurality of tire components including for instance apexes 5, chippers 7 and flippers 8, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire 1 could also have for instance more or less than four grooves or a different number of belt plies than depicted.

Figure 2:
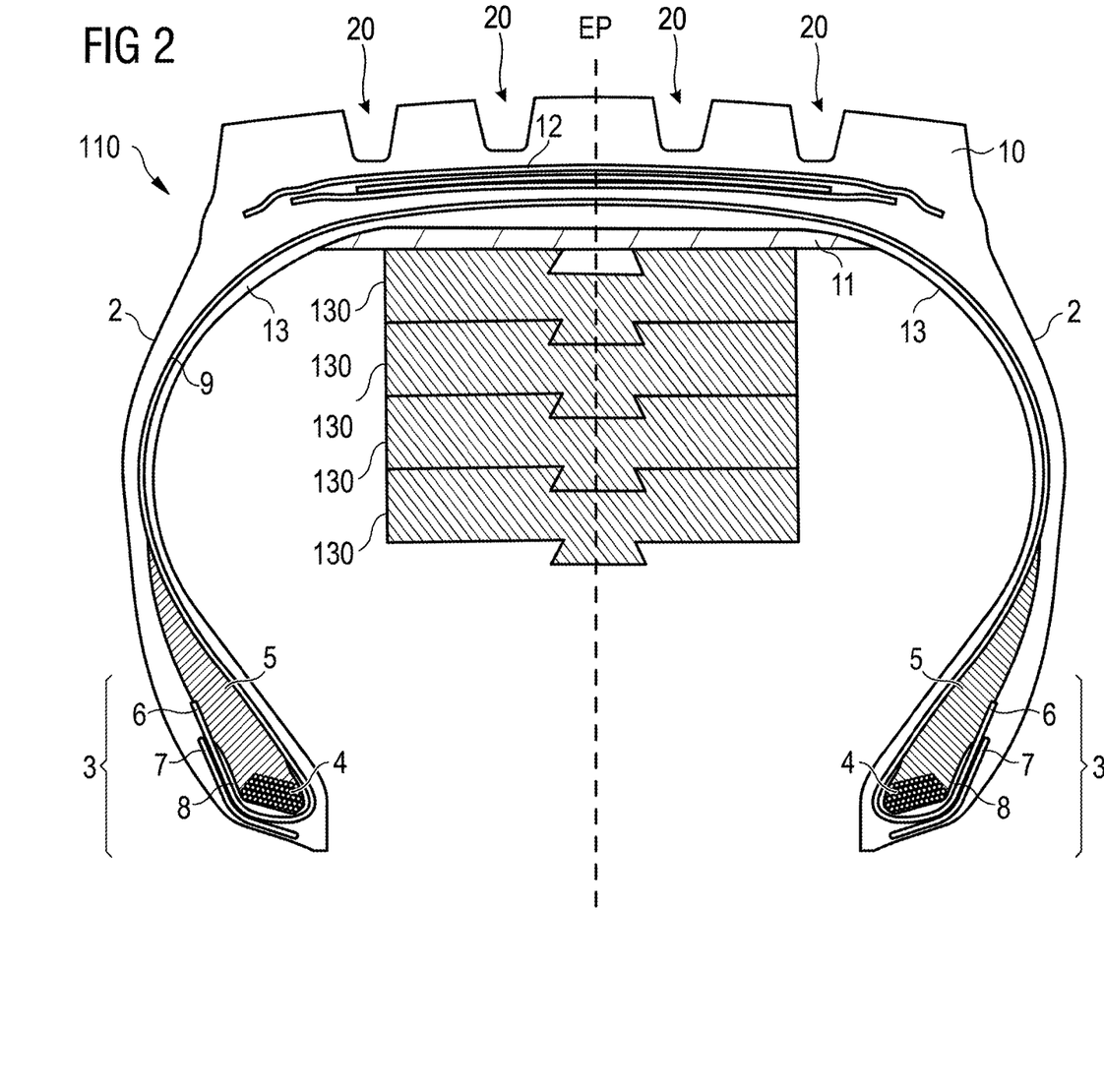
FIG. 2 shows a schematic cross-section of another truck or bus tire having four layers of foam material in accordance with another embodiment of the present invention.

FIG. 2 shows another example of a tire 110, which has four layers 130 of open cell noise dampening foam strip material. For the sake of easier reference, the same reference numerals as in FIG. 1 have been used for other elements of the tire 110. The same applies to FIG. 3. In contrast to the embodiment of FIG. 1, FIG. 2 shows a first layer 130 of open cell noise dampening foam strip material attached to the innerliner 13 by means of a sealant layer 11. Thus, the sealant layer 11 acts as adhesive. Sealants are typically used to seal punctures in the tread 10, which are made by screws, nails, and other sharp objects. Such sealant material is typically very sticky and known to the person skilled in the art. Similar to the arrangement described in accordance with FIG. 1, each layer 130 has on one of its radially inner and outer sides a male element and on an opposite side a female element for mechanically interconnecting or fitting layers to each other. Preferably, such interconnecting elements are provided in a lateral center area of the layers 130. This modular system allows easy adding of layers in dependence of the actual tire. Additional glues are avoided completely in this embodiment.

Figure 3:
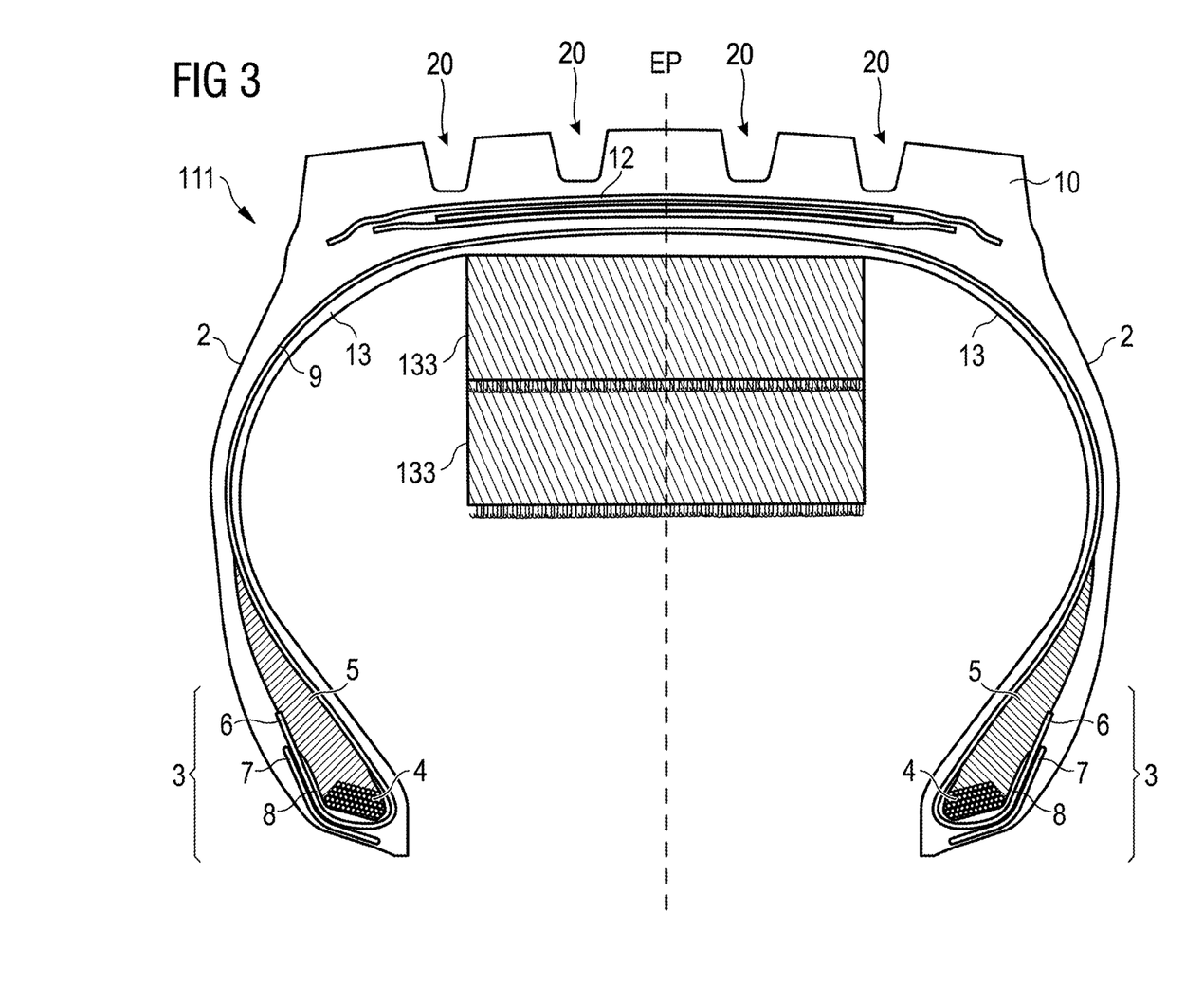
FIG. 3 shows a schematic cross-section of another truck or bus tire having two layers of foam material connected to each other by a Velcro connection.

FIG. 3 shows another embodiment in accordance with the present invention in which a tire 111 has two layers 133 mechanically interconnected by Velcro connectors. Both layers could be made of the same material, wherein the radially outermost layer could for instance be glued to the innerliner 13.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case the above described embodiments and examples shall not be understood in a limiting sense. In particular, the features of the above embodiments may also be replaced or combined with one another.

The invention claimed is:

1. A pneumatic tire, comprising two spaced apart bead portions, a tread portion, a pair of sidewalls extending radially inward from axially outer edges of the tread portion to join the respective bead portions, the axially outer edges of the tread portion defining a tread width, a carcass, an innerliner covering the carcass and defining a tire cavity, and multiple layers of foam strip material attached on top of each other to the innerliner within the tire cavity in an area radially below the tread portion and comprising at least one layer of noise damping foam strip material, wherein at least two of the layers are interlocked to each other along their length so as to hold the layers together in a radial direction wherein said layers are attached to each other by a mating connection, wherein a male connecting member of a first layer is connected to a female connecting member of a second layer, wherein a first layer is attached to the innerliner of the tire by its male member via an adhesive.

2. The tire of claim 1, wherein the noise damping foam strip material is an open cell foam strip material.

3. The tire of claim 2, wherein the open cell noise damping material has a density from 0.01 g/cm$^3$ to 1 g/cm$^3$.

4. The tire of claim 1, wherein each layer has an axial width ranging from 20% to 80% of the tread width and a radial thickness ranging from 5% to 20% of the tread width and said multiple layers fill together from 8% to 40% of the volume of the tire cavity.

5. The tire of claim 1, wherein said multiple layers are integrally formed and spirally wound on top of one another in the tire cavity.

6. The tire of claim 1, wherein a first layer of said multiple layers has a first butt splice arranged at a first circumferential position of the tire cavity, and wherein a second layer of said multiple layers has a second butt splice arranged at a second circumferential position of the tire cavity which is different from the first circumferential position.

7. The tire of claim 6, wherein the position of the second butt splice of the second layer is arranged at an angular position which is between 100° and 260° circumferentially shifted from an angular position of the first butt splice of the first layer.

8. The tire of claim 1, wherein the layers have one or more of: an axial width from 50% to 70% of the tread width, a radial thickness from 5% to 15% of the tread width, and fill together from 20% to 40% of the volume of the tire cavity.

9. The tire of claim 1, wherein each of the layers is arranged essentially in parallel to the equatorial plane of the tire and has a length covering at least 80% of the inner circumference of the tire.

10. The tire of claim 1, wherein a first foam strip material layer attached to the innerliner has a smaller axial width than a second foam strip material layer arranged on top of the first foam strip material layer attached to the innerliner.

11. The tire of claim 1, wherein said interlocking is essentially continuous over the length of the foam strip material between two layers attached on top of each other.

12. The tire of claim 1, wherein said male connecting member and female connecting member are integrally formed in the strip material.

13. The tire of claim 1, wherein the male member of the first layer extends over an axial width of 20% to 100% of the axial width of the first layer, and a radially outer surface of the male member of the first layer has a larger axial width than a radially inner portion of the male member of the first layer, and wherein said larger axial width is at least 2 times larger than the axial width of the radially inner portion of the male member of the first layer.

14. The tire of claim 1, wherein the open cell noise dampening foam strip material is selected from the group consisting polyurethane foam, polyethylene foam, and rubber foam.

\* \* \* \* \*